Patented June 11, 1940

2,204,494

UNITED STATES PATENT OFFICE 2,204,494

PREPARATION OF DERIVATIVES OF β-(P-HYDROXYPHENYL)-ISOPROPYLAMINE

Gustav Hildebrandt, Mannheim, Germany, assignor to E. Bilhuber Inc., Jersey City, N. J.

No Drawing. Application December 23, 1937, Serial No. 181,460. In Germany December 31, 1936

3 Claims. (Cl. 260—574)

This invention relates to the preparation of derivatives of β-(p-hydroxyphenyl)-isopropylamine of the general formula:

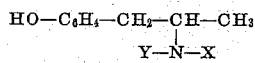

In this formula X designates hydrogen, an alkyl radical, for example methyl, ethyl, propyl, isopropyl, butyl, isobutyl, isoamyl, etc., or a cycloalkyl radical, for example cyclohexyl, o-, m- or p-methyl-cyclohexyl, tetrahydronaphthyl, decahydronaphthyl, etc., and Y an alkyl radical containing at least two carbon atoms, for example ethyl, propyl, isopropyl, butyl, isobutyl, isoamyl, etc., or a cycloalkyl radical such as cyclohexyl, o-, m- or p-methylcyclohexyl, tetrahydronaphthyl, decahydronaphthyl, etc.

It has already been proposed to prepare β-(p-methoxyphenyl)-isopropylmethylamine by treating p-methoxybenzylmethylketone with agents, which yield formic acid and methylamine. The formyl compound of β-(p-methoxyphenyl)-isopropylmethylamine is obtained thereby and is saponified with dilute mineral acids.

According to another proposal β-(p-hydroxyphenyl)-isopropylmethylamine may be obtained from β-(p-methoxyphenyl)-isopropylmethylamine by eliminating the methoxy group with strong acids. The resulting β-(p-hydroxyphenyl)-isopropylmethylamine is stated to be physiologically active and to exert actions similar to those of ephedrine.

According to the process of U. S. A. Patent application Serial No. 144,546 β-(p-hydroxyphenyl)-isopropylmethylamine is prepared by condensing p-hydroxy-benzylmethylketone with methylamine and simultaneously or subsequently reducing.

According to this invention it has been found that the favourable therapeutic properties of β-(p-hydroxyphenyl)-isopropylmethylamine are not limited to this substance alone but that substances of the like favourable therapeutic properties may be obtained by condensing p-hydroxybenzylmethylketone with amines of the general formula RNH₂, wherein R designates an alkyl radical or a cycloalkyl radical, and simultaneously or subsequently reducing the condensation product. In the preparation of the products of this invention of the general formula

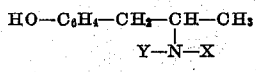

the amines of the general formula RNH₂ must be so selected that they yield either X or Y or X and Y. The condensation is therefore carried out either with alkylamines, for example methyl-, ethyl-, propyl-, isopropyl-, butyl-, isobutyl- or isoamylamine, or with cycloalkylamines, for example cyclohexyl-, o-, m- or p-methyl-cyclohexylamine, tetrahydronaphthylamine, decahydronaphthylamine or with both kinds of amines and the quantities thereof are so selected that the desired product of the aforesaid general formula is obtained.

The reduction of the condensation products may be carried out in any desired known manner, preferably with nascent hydrogen.

Example 30.0 gms. of p-hydroxybenzylmethylketone, 19.8 gms. of cyclohexylamine, 250 ccs. of alcohol, 20 gms. of activated aluminium turnings and 50 ccs. of water, are boiled for 6 hours under a reflux condenser. After separating the solution from the aluminium hydroxide formed, it is evaporated down, treated with dilute acid, and, in order to remove any non-converted ketone fractions, shaken out with benzol. The base precipitated from the acid solution with alkali lye forms a hydrochloride of melting point 209° C., which readily crystallises.

By eliminating the methoxyl group with concentrated hydrohalic acid the base β-(p-hydroxyphenyl)-isopropylcyclohexylamine is obtained, the crystalline hydrochloride of which melts to 258° C.

The yield amounts to 80–90% of theory.

What I claim is:

1. A process for the preparation of derivatives of β-(p-hydroxyphenyl)-isopropylamine having the formula HO—C₆H₄—CH₂—CH—CH₃
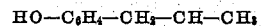

wherein R is selected from the group consisting of lower alkyl radicals containing at least two carbon atoms and cycloalkyl radicals, which consists in condensing p-hydroxybenzylmethylketone with an amine of the formula RNH₂ and reducing the condensation product at the nitrogen atom to form the corresponding saturated amine.

2. A process according to claim 1, wherein the steps of condensation with the amine RNH₂ and reduction of the condensation product at the nitrogen atom to form the corresponding saturated amine are effected simultaneously.

3. A process according to claim 1, wherein the steps of condensation with the amine RNH₂ and reduction of the condensation product at the nitrogen atom to form the corresponding saturated amine are effected consecutively.

GUSTAV HILDEBRANDT.